(12) United States Patent
Lister

(10) Patent No.: US 10,650,480 B2
(45) Date of Patent: May 12, 2020

(54) METHODS OF MANUFACTURING SECURITY DOCUMENTS AND SECURITY DEVICES

(71) Applicant: DE LA RUE INTERNATIONAL LIMITED, Basingstoke, Hampshire (GB)

(72) Inventor: Adam Lister, Andover (GB)

(73) Assignee: DE LA RUE INTERNATIONAL LIMITED, Basingstoke (GB)

(*) Notice: Subject to any disclaimer, the term of this patent is extended or adjusted under 35 U.S.C. 154(b) by 149 days.

(21) Appl. No.: 15/738,460

(22) PCT Filed: Jul. 11, 2016

(86) PCT No.: PCT/GB2016/052083
§ 371 (c)(1),
(2) Date: Dec. 20, 2017

(87) PCT Pub. No.: WO2017/009618
PCT Pub. Date: Jan. 19, 2017

(65) Prior Publication Data
US 2018/0178577 A1 Jun. 28, 2018

(30) Foreign Application Priority Data

Jul. 10, 2015 (GB) .................................. 1512118.9

(51) Int. Cl.
*G02B 27/10* (2006.01)
*G06T 1/00* (2006.01)
(Continued)

(52) U.S. Cl.
CPC ...... *G06T 1/0014* (2013.01); *B29D 11/00298* (2013.01); *B29D 11/00365* (2013.01);
(Continued)

(58) Field of Classification Search
CPC ........ B29D 11/00442; B29D 11/00298; B29D 11/00365; B29D 11/00307;
(Continued)

(56) References Cited

U.S. PATENT DOCUMENTS

| 4,892,336 A | 1/1990 | Kaule et al. |
| 6,856,462 B1 | 2/2005 | Scarbrough et al. |

(Continued)

FOREIGN PATENT DOCUMENTS

| AU | 2015/100670 A4 | 6/2015 |
| GB | 2503783 A | 1/2014 |

(Continued)

OTHER PUBLICATIONS

Oct. 24, 2016 International Search Report issued in International Application No. PCT/GB2016/052083.

(Continued)

*Primary Examiner* — Alicia M Harrington
(74) *Attorney, Agent, or Firm* — Oliff PLC

(57) ABSTRACT

A method of making a security device, comprising: forming an array of primary focusing elements on a first region of a focusing element support layer, by applying at least one transparent curable material either to the focusing element support layer or to a casting tool carrying a surface relief over an area which includes at least the first region, the surface relief comprising portions corresponding to the primary focusing elements; forming the transparent curable material(s) with the casting tool; and curing the transparent curable material(s) so as to retain the surface relief in the first region; wherein the surface relief further includes a plurality of structures of greater depth than the height of the primary focusing elements such that the cured transparent material(s) include a plurality of features protruding above the height of the primary focusing elements between primary focusing elements of the array.

18 Claims, 8 Drawing Sheets

(51) Int. Cl.

| | |
|---|---|
| *B29D 11/00* | (2006.01) |
| *G02B 3/00* | (2006.01) |
| *B42D 25/425* | (2014.01) |
| *B42D 25/45* | (2014.01) |
| *B42D 25/455* | (2014.01) |
| *B42D 25/324* | (2014.01) |
| *B42D 25/46* | (2014.01) |
| *B42D 25/355* | (2014.01) |
| *B42D 25/378* | (2014.01) |
| *B42D 25/48* | (2014.01) |
| *B42D 25/342* | (2014.01) |
| *B42D 25/351* | (2014.01) |
| *B41M 3/14* | (2006.01) |
| *G02B 1/04* | (2006.01) |
| *G06T 7/80* | (2017.01) |
| *G06K 9/32* | (2006.01) |
| *H04N 1/00* | (2006.01) |
| *H04N 5/232* | (2006.01) |
| *H04N 5/247* | (2006.01) |
| *B42D 25/29* | (2014.01) |
| *B42D 25/23* | (2014.01) |
| *B42D 25/24* | (2014.01) |
| *B42D 25/47* | (2014.01) |

(52) U.S. Cl.
CPC ........ *B29D 11/00442* (2013.01); *B41M 3/14* (2013.01); *B42D 25/324* (2014.10); *B42D 25/342* (2014.10); *B42D 25/351* (2014.10); *B42D 25/355* (2014.10); *B42D 25/378* (2014.10); *B42D 25/425* (2014.10); *B42D 25/45* (2014.10); *B42D 25/455* (2014.10); *B42D 25/46* (2014.10); *B42D 25/48* (2014.10); *G02B 1/041* (2013.01); *G02B 3/005* (2013.01); *G02B 3/0006* (2013.01); *G02B 3/0012* (2013.01); *G02B 3/0031* (2013.01); *G06K 9/3216* (2013.01); *G06K 9/3275* (2013.01); *G06T 7/80* (2017.01); *H04N 1/00267* (2013.01); *H04N 5/23212* (2013.01); *H04N 5/247* (2013.01); *B42D 25/23* (2014.10); *B42D 25/24* (2014.10); *B42D 25/29* (2014.10); *B42D 25/47* (2014.10); *G06K 2009/3225* (2013.01); *G06T 2207/30144* (2013.01)

(58) Field of Classification Search
CPC ........ B29D 11/00317; B29D 11/00336; B29D 11/00346; B29D 11/00807; B29D 11/0074; B42D 25/48; B42D 25/355; B42D 25/351; B42D 25/342; G02B 3/0012; G02B 3/0006; G02B 3/0056; G02B 3/0031; G02B 3/005; G02B 27/2214; G02B 3/0043; G02B 6/0053; G02B 27/0961; G02B 27/09; G02B 27/0966; G02G 5/045; G06T 1/00; G06T 1/0014

See application file for complete search history.

(56) References Cited

U.S. PATENT DOCUMENTS

| | | | |
|---|---|---|---|
| 7,009,771 B2* | 3/2006 | Bourdelais | G02B 5/0221 359/454 |
| 2008/0037131 A1 | 2/2008 | Steenblik et al. | |
| 2008/0182084 A1 | 7/2008 | Tompkin et al. | |
| 2009/0297805 A1 | 12/2009 | Dichtl | |
| 2011/0045248 A1 | 2/2011 | Hoffmuller et al. | |

FOREIGN PATENT DOCUMENTS

| | | |
|---|---|---|
| JP | 2011-051185 A | 3/2011 |
| WO | 94/27254 A1 | 11/1994 |
| WO | 2005/052650 A2 | 6/2005 |
| WO | 2010/044846 A1 | 4/2010 |
| WO | 2011/051669 A1 | 5/2011 |
| WO | 2011/051670 A2 | 5/2011 |
| WO | 2011/102800 A1 | 8/2011 |
| WO | 2011/107782 A1 | 9/2011 |
| WO | 2011/107783 A1 | 9/2011 |
| WO | 2011/116425 A1 | 9/2011 |
| WO | 2012/027779 A1 | 3/2012 |
| WO | 2013/167887 A1 | 11/2013 |
| WO | 2014/070079 A1 | 5/2014 |
| WO | 2015/044671 A1 | 4/2015 |

OTHER PUBLICATIONS

Jan. 12, 2017 Search Report issued in British Patent Application No. 1612018.0.
Jun. 30, 2016 Search Report issued in British Patent Application No. 1609046.6.
Jan. 16, 2018 International Preliminary Report on Patentability issued in International Application No. PCT/GB2016/052083.

* cited by examiner

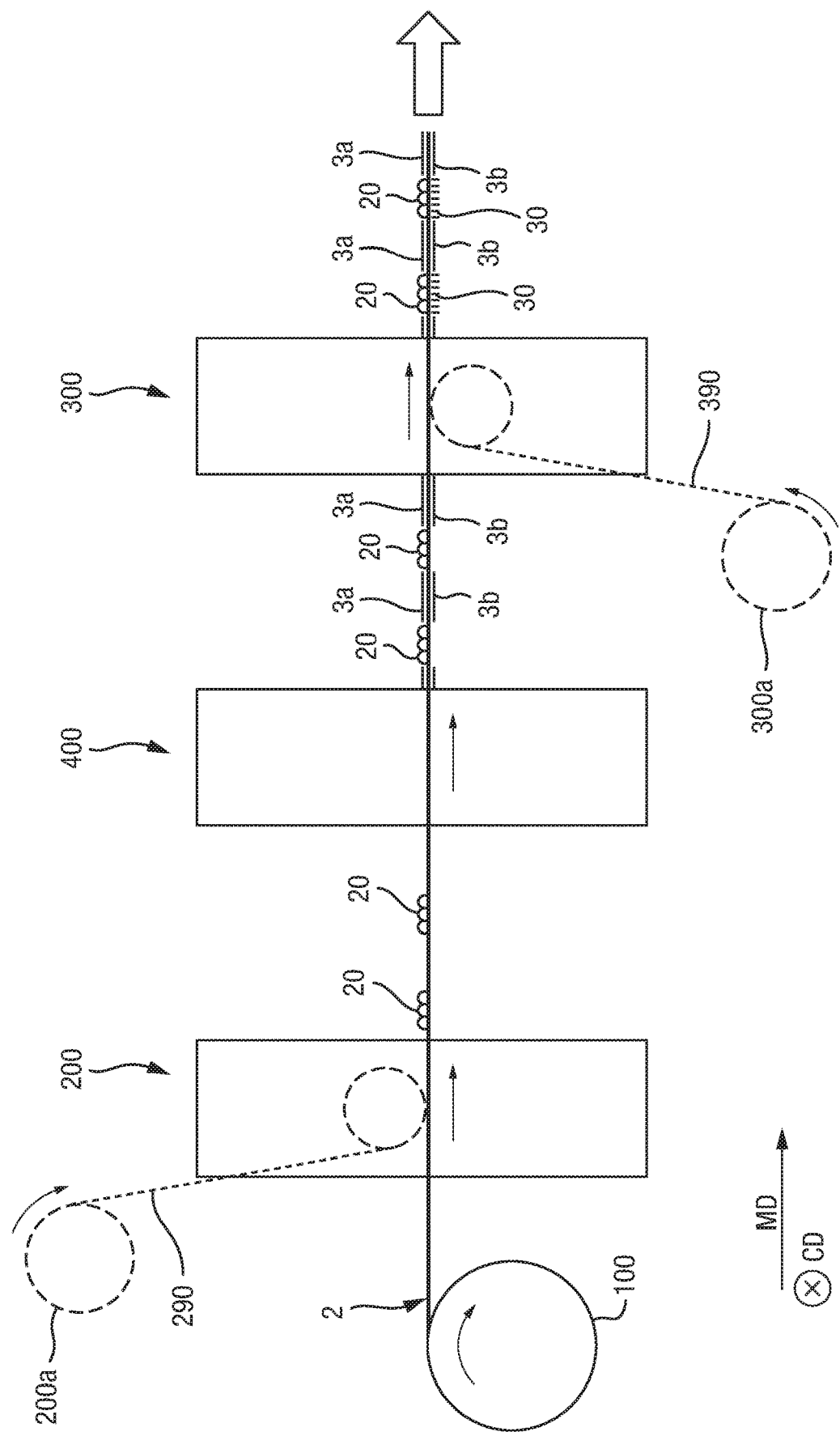

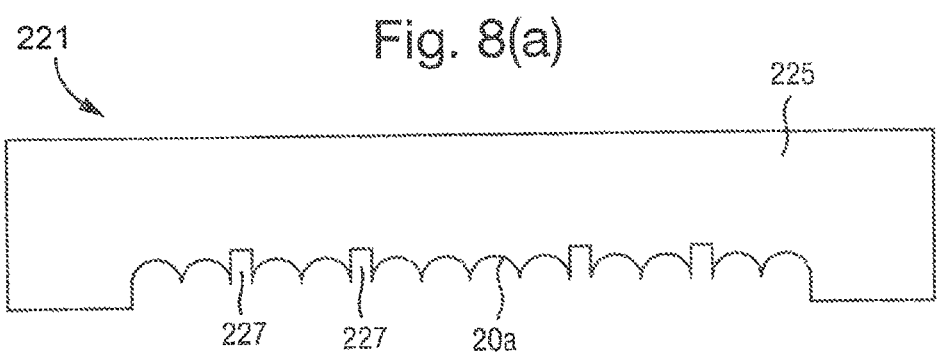
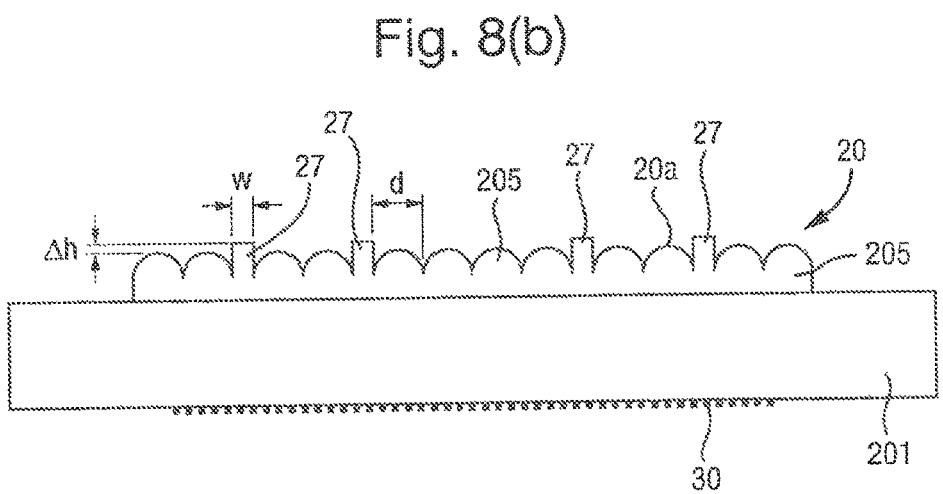

METHODS OF MANUFACTURING SECURITY DOCUMENTS AND SECURITY DEVICES

This invention relates to methods of manufacturing security documents and security devices, and to the corresponding products. Security devices are typically used on security documents such as banknotes, cheques, passports, identity cards, certificates of authenticity, fiscal stamps and other secure documents, in order to confirm their authenticity.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. By "security device" we mean a feature which it is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focussing elements such as lenses, including moiré magnifier devices, integral imaging devices and so-called lenticular devices.

Security devices comprising focussing elements typically require the use of at least one transparent material either to act as an optical spacer between the focussing elements and an image, or image array, on which the focussing elements are to focus, or to act as a support for the focussing element so that some other object can be viewed therethrough. As such, security devices comprising focussing elements are particularly well suited to deployment on security documents based on polymer document substrates, such as polymer banknotes, since the polymer document substrate can be selected to be transparent and so provide one or both of the above functions if desired. Therefore, in the main part the present disclosure relates to polymer-based security documents.

However, other aspects of the invention disclosed herein are not so limited as will be made clear below. For example, the security devices can be formed using a transparent material which is applied to a security document of any sort, such as a conventional paper-based document, e.g. in the form of a security article such as a thread, strip, patch, foil or inserted which is incorporated into or applied onto the security document.

Several aspects of the invention involve the provision of a focussing element array and an image array located approximately in the focal plane of the focussing element array such that the focussing element array exhibits a substantially focussed image of the image array. This focussed image may preferably be optically variable and could for example be based on any of the mechanisms detailed below. It should be appreciated that in all aspects of the invention the focussing element array and image array could optionally be configured to provide any one or more of these effects, unless otherwise specified:

Moiré magnifier devices (examples of which are described in EP-A-1695121, WO-A-94/27254, WO-A-2011/107782 and WO2011/107783) make use of an array of focusing elements (such as lenses or mirrors) and a corresponding array of microimages, wherein the pitches of the focusing elements and the array of microimages and/or their relative locations are mismatched with the array of focusing elements such that a magnified version of the microimages is generated due to the moiré effect. Each microimage is a complete, miniature version of the image which is ultimately observed, and the array of focusing elements acts to select and magnify a small portion of each underlying microimage, which portions are combined by the human eye such that the whole, magnified image is visualised. This mechanism is sometimes referred to as "synthetic magnification". The magnified array appears to move relative to the device upon tilting and can be configured to appear above or below the surface of the device itself. The degree of magnification depends, inter alia, on the degree of pitch mismatch and/or angular mismatch between the focusing element array and the microimage array.

Integral imaging devices are similar to moiré magnifier devices in that an array of microimages is provided under a corresponding array of lenses, each microimage being a miniature version of the image to be displayed. However here there is no mismatch between the lenses and the microimages. Instead a visual effect is created by arranging for each microimage to be a view of the same object but from a different viewpoint. When the device is tilted, different ones of the images are magnified by the lenses such that the impression of a three-dimensional image is given.

"Hybrid" devices also exist which combine features of moiré magnification devices with those of integral imaging devices. In a "pure" moiré magnification device, the microimages forming the array will generally be identical to one another. Likewise in a "pure" integral imaging device there will be no mismatch between the arrays, as described above. A "hybrid" moiré magnification/integral imaging device utilises an array of microimages which differ slightly from one another, showing different views of an object, as in an integral imaging device. However, as in a moiré magnification device there is a mismatch between the focusing element array and the microimage array, resulting in a synthetically magnified version of the microimage array, due to the moiré effect, the magnified microimages having a three-dimensional appearance. Since the visual effect is a result of the moiré effect, such hybrid devices are considered a subset of moiré magnification devices for the purposes of the present disclosure. In general, therefore, the microimages provided in a moiré magnification device should be substantially identical in the sense that they are either exactly the same as one another (pure moiré magnifiers) or show the same object/scene but from different viewpoints (hybrid devices).

Moiré magnifiers, integral imaging devices and hybrid devices can all be configured to operate in just one dimension (e.g. utilising cylindrical lenses) or in two dimensions (e.g. comprising a 2D array of spherical or aspherical lenses).

Lenticular devices on the other hand do not rely upon magnification, synthetic or otherwise. An array of focusing elements, typically cylindrical lenses, overlies a corresponding array of image sections, or "slices", each of which depicts only a portion of an image which is to be displayed. Image slices from two or more different images are interleaved and, when viewed through the focusing elements, at each viewing angle, only selected image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. More recently, two-dimensional lenticular devices have also been developed and examples of these are disclosed in British patent application numbers 1313362.4 and 1313363.2. Lenticular devices have the advantage that different images can be displayed at different viewing angles, giving rise to the possibility of animation and other striking visual effects which are not possible using the moiré magnifier or integral imaging techniques.

Arrays of lenses or other focussing elements can also be used as a security device on their own (i.e. without a corresponding image array), since they can be used to exhibit a magnified or distorted view of any background they may be placed against, or scene viewed therethrough. This effect cannot be replicated by photocopying or similar.

Aspects of the present invention provide improved methods of manufacturing security documents comprising security devices of the sorts described above.

The present invention provides a method of making a security device, comprising:
  (a) forming an array of primary focussing elements on a first region of a focussing element support layer, by:
  (a)(i) applying at least one transparent curable material either to the focussing element support layer or to a casting tool carrying a surface relief over an area which includes at least the first region, the surface relief comprising portions corresponding to the primary focussing elements;
  (a)(ii) forming the transparent curable material(s) with the casting tool;
and
  (a)(iii) curing the transparent curable material(s) so as to retain the surface relief in the first region;
wherein the surface relief further includes a plurality of structures of greater depth than the height of the primary focussing elements such that the cured transparent material(s) include a plurality of features protruding above the height of the primary focussing elements between primary focussing elements of the array, wherein the surface relief is configured such that more than one of the primary focussing elements of the array space each of the plurality of features from the next.

The protruding features act to protect the surfaces of the (primary) focussing elements from damage during handling of the finished device, by holding foreign objects (such as a user's fingertips) away from the surfaces. Hence this configuration is particularly desirable in cases where the focussing element array is not covered by another component or layer in the finished article. By arranging the protruding features such that several of the focussing elements space them apart from one another, the presence of the protruding features has minimal impact on the visual appearance of the finished device, which most preferably is substantially the same as would be the case in the absence of the protruding features. That is, the protruding features do not noticeably modify the optical effect of the array of primary focussing elements.

Preferably the features protruding above the height of the focussing elements are spaced periodically across the array, that is at substantially regular intervals. This could be in one dimension or in two dimensions. In especially preferred embodiments, the features protruding above the height of the primary focussing elements are arranged with a spacing of at least one such feature every 50 primary focussing elements (i.e. no more than 50 primary focussing elements will be located between neighbouring protrusions), more preferably at least every 30 primary focussing elements, most preferably at least every 10 primary focussing elements. In this way the protrusions are provided at sufficiently small intervals so as to substantially prevent foreign bodies from extending through the spaces between the protrusions and contacting the focussing elements.

Nonetheless as mentioned above it is also important that the protrusions are not provided so frequently across the array as to significantly affect the visual appearance thereof. Hence, preferably the plurality of features protruding above the height of the primary focussing elements collectively occupies no more than 10% of the first region, preferably no more than 5%. Similarly it is desirable that each of the features protruding above the height of the primary focussing elements is spaced from the next by at least 5 primary focussing elements, more preferably at least 10 primary focussing elements.

Advantageously each of the features protruding above the height of the primary focussing elements has a width (in at least one dimension, optionally two) of no greater than 10 times the primary focussing element diameter (width, in the case of an elongate focussing element), more preferably no greater than 5 times the primary focussing element diameter, still preferably no greater than 3 times the focussing element diameter, most preferably approximately equal to the focussing element diameter. This again helps to reduce the visual impact of the protrusions since each one individually occupies a space comparable in size to one of the primary focussing elements.

Preferably each of the features protruding above the height of the focussing elements has a height at least 5 microns greater than the height of the primary focussing elements, more preferably at least 10 microns greater than the height of the primary focussing elements. However, the height of the protruding features should preferably not be any greater than the thickness of the polymer substrate.

Each feature could have the form of a post or a "fence" for example. However, in other embodiments, at least some of the plurality of features protruding above the height of the primary focussing elements may preferably comprise secondary focussing elements. That is, the protruding features could also take the form of focussing elements, but having a greater height than the primary focussing elements. Nonetheless, any visual effect the secondary focussing elements might contribute is reduced and preferably eliminated by the measures already described above.

The primary focussing elements may comprise lenses or mirrors for example, preferably spherical, aspherical or cylindrical lenses or mirrors. If the protrusions are secondary focussing elements, these too may take any of these forms.

The method may preferably further comprise: (b) providing an image array located in a plane spaced from the array of primary focussing elements by a distance substantially equal to the focal length of the primary focussing elements whereby the primary focussing elements exhibit a substantially focussed image of the image array.

The invention further provides a security device, comprising an array of primary focussing elements formed of at least one curable transparent material disposed across a first region of a focussing element support layer, wherein the array further includes a plurality of features protruding above the height of the focussing elements, formed of the at least one curable material, between primary focussing elements of the array, wherein more than one of the primary focussing elements of the array space each of the plurality of features from the next and wherein the features are arranged with a spacing of at least one feature every 50 primary focussing elements.

As described above, the protruding features protect the surface of the focussing elements from contact with foreign bodies whilst not having a significant effect on the visual appearance of the device, which is determined by the array of primary focussing elements. The security device can have any of the preferred features mentioned above. Most desirably, the surface of the focussing element array is uncovered.

Preferably the image array if proved is located on the second surface of the focussing element support layer or on the far surface of an underlying polymer substrate. However, in other cases the image array or a second image array could be provided on the first surface of such a polymer substrate, e.g. if the focussing element array is formed in an additional transparent layer applied to the first surface of the polymer substrate and itself provides the necessary optical spacing. Such an additional transparent layer could be provided by laminating a component carrying the focussing element array onto the first surface, or by cast curing for instance.

Preferably, the image array can be configured to co-operate with the focussing element array to produce an optically variable effect, e.g. of any of the types mentioned above. For example, in a particularly preferred embodiment, the image array comprises a microimage array, and the pitches of the focusing element array and of the microimage array and their relative orientations are such that the focusing element array co-operates with the microimage array to generate a magnified version of the microimage array due to the moiré effect. (Moiré magnifier)

In another case, the image array comprises a microimage array, the microimages all depicting the same object from a different viewpoint, and the pitches and orientation of the focusing element array and of the microimage array are the same, such that the focusing element array co-operates with the microimage array to generate a magnified, optically-variable version of the object. (Integral imaging device)

In a still further example, the image array comprises a set of first image elements comprising portions of a first image, interleaved with a set of second image elements comprising portions of a second image, the focusing element array being configured such that each focusing element can direct light from a respective one of the first image elements or from a respective one of the second image elements therebetween in dependence on the viewing angle, whereby depending on the viewing angle the array of focusing elements directs light from either the set of first image elements or from the second image elements therebetween, such that as the device is tilted, the first image is displayed to the viewer at a first range of viewing angles and the second image is displayed to the viewer at a second, different range of viewing angles. (Lenticular device)

The security documents and security devices of the current invention can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all aspects of the invention.

Examples of security documents, security devices and methods of manufacture thereof will now be described with reference to the accompanying drawings, in which.

Figure 4A:
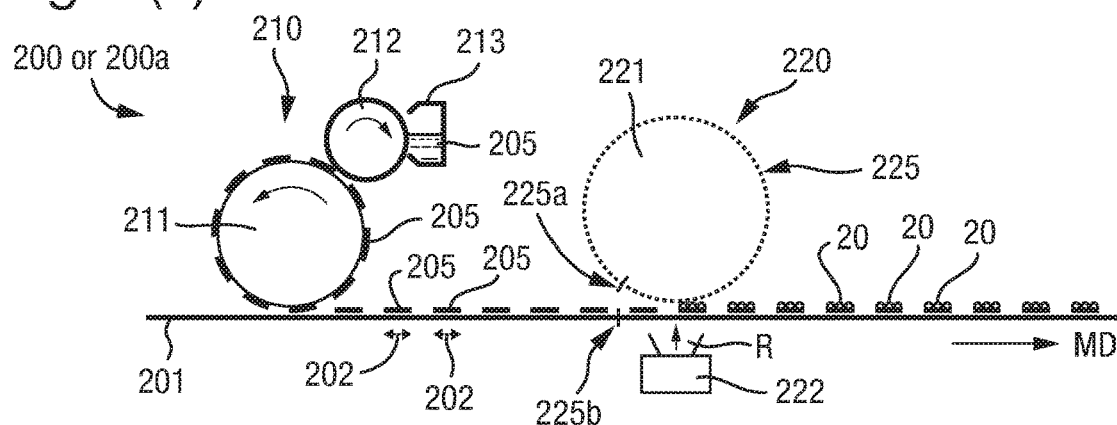
Figure 4B:
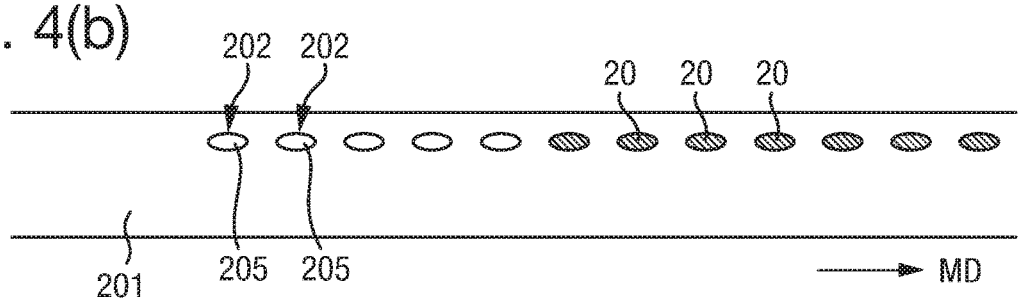
Figure 5A:
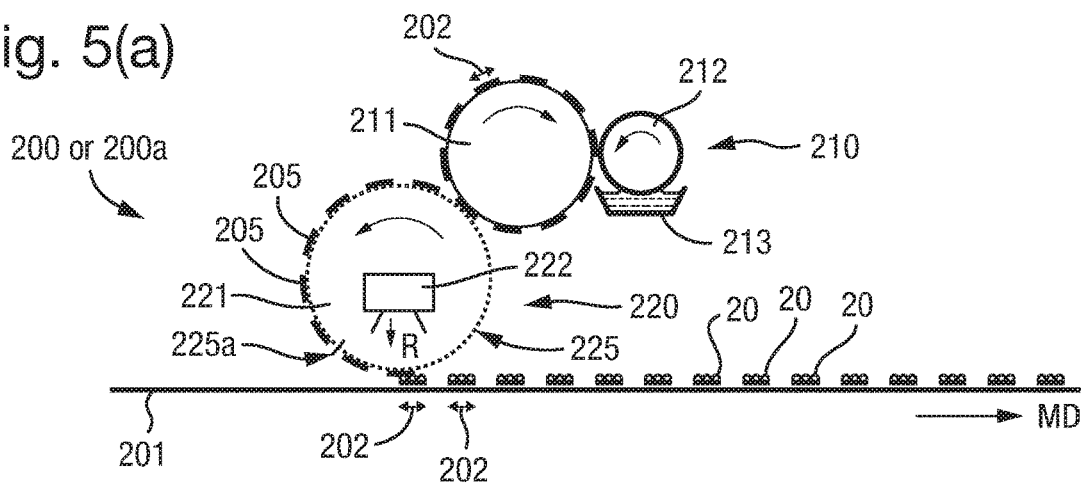
Figure 5B:
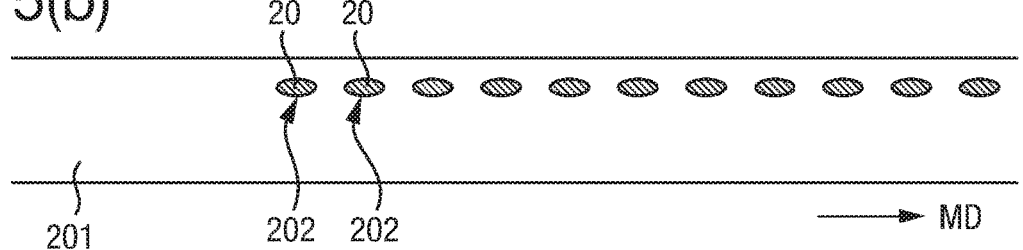
Figure 5C:
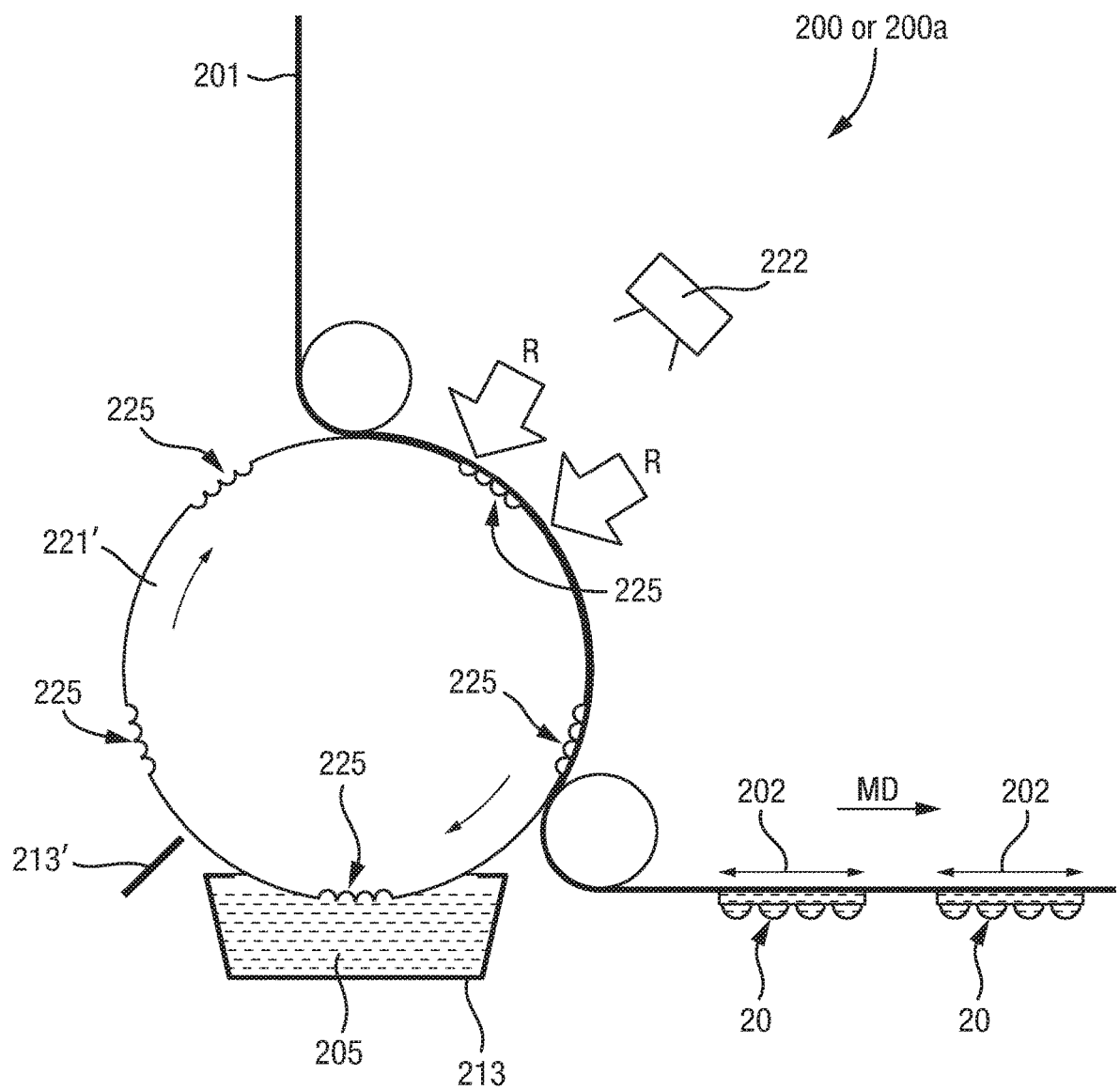

FIG. 3 schematically depicts exemplary apparatus for manufacturing a security document in an embodiment;

FIGS. 4, 5, 6 and 7 show examples of apparatus for forming a focussing element array, in each case illustrating (a) the apparatus from a side view, and (b) a perspective view of the focussing element support layer, FIG. 5(c) showing a further variant of FIG. 5(a);

FIG. 8 shows (a) an embodiment of a surface relief on a casting tool suitable for use in any of the methods of FIGS. 4 to 7, and (b) a corresponding focussing element array formed on a support layer using the surface relief; and FIG. 9A to J shows examples of elements of image arrays formed as relief structures.

The ensuing description will focus on preferred techniques for the manufacture of security documents, such as bank notes, based on polymer document substrates. However, many aspects of the disclosure are more widely applicable and so should not be considered limited to use on polymer-based security documents unless otherwise indicated or necessitated by the nature of the product or method in question. For example, many of the methods and products described below can be utilised on security documents of conventional construction, e.g. paper-based documents. For instance, the described methods can be performed on a polymeric support layer which can then be affixed to or incorporated into a security document of any type. However, in all cases the preference is for combination with a polymer-based security document.

To aid understanding, the following terminology has been used throughout the present disclosure:

Polymer substrate—this refers to a polymer document substrate which ultimately forms the main body of a security document. Examples of such polymer substrates are discussed below.

Focussing element array—this refers to an array of elements capable of focussing visible light, such as lenses or mirrors. The term "array of focussing elements" is analogous. Examples are given below.

Image array—this refers to a graphic which typically comprises a pattern of microimages or image elements, although neither is essential. In preferred cases the image array co-operates with a focussing element array to generate an optically variable effect. For example, the image array and the focussing element array may in combination form a moiré magnifier, an integral imaging device or a lenticular device (each described above), or some other optically variable device. In many preferred examples, the image array is formed of elements of applied ink or another such material. However this is not essential since the image array could instead be formed of recesses or the like. Preferred methods of manufacturing image arrays are discussed below.

Focussing element support layer—this is a layer on the surface of which the focussing elements are formed. The focussing element support layer could be the polymer substrate (defined above) or could be another layer which is then applied to a document substrate (paper or polymer), or used as a carrier from which the focussing elements are later transferred to a document substrate (paper or polymer). For instance the focussing element support layer could take the form of a security article such as a thread, strip, patch or foil which is then incorporated into or onto a security document.

Pattern support layer—this is a layer on the surface of which the image array (e.g. a pattern) is formed. The pattern support layer could be the polymer substrate (defined above) or could be another layer which is then applied to a document substrate (paper or polymer), or used as a carrier from which the image array is later transferred to a document substrate (paper or polymer). For instance the pattern support layer could take the form of a security article such as a thread, strip, patch or foil which is then incorporated into or onto a security document.

Transparent material—"transparent" is used to mean that the material is substantially visually clear, such that an item on one side of the material can be seen sharply through the material from the other side. Therefore transparent materials should have low optical scatter. However, transparent materials may nonetheless be optically detectable (defined below), e.g. carrying a coloured tint.

Optically detectable material/optical detection characteristics—an optically detectable material may or may not be transparent but is detectable either to the human eye or to a machine via an optical detector (e.g. a camera), or both. Thus, the optical detection characteristic(s) of the material could be for example a visible colour, a non-visible reflection or absorbance such as UV or IR reflection or absorbance, or a photoluminescent response such as fluorescence or phosphorescence (the stimulating radiation and/or the emitted radiation being visible or invisible), or the like.

Curable material—"curable" means that the material hardens (i.e. becomes more viscous and preferably solid) in response to exposure to curing energy which may for example comprise heat, radiation (e.g. UV) or an electron beam. The hardening involves a chemical reaction such as cross-linking rather than mere physical solidification, e.g. as is experienced by most materials upon cooling.

For reference throughout the description of preferred manufacturing processes below, FIG. 1 shows an exemplary security document 1, such as a banknote, based on a polymer substrate construction. FIG. 1(a) shows the document in plan view and FIGS. 1(b), (c) and (d) show three alternative cross-sections along the line X-X'. It will be appreciated that the constructions shown are merely exemplary and alternative arrangements are viable, some of which will be discussed with reference to particular preferred manufacturing techniques discussed below.

The security document 1 is based on a polymer substrate 2 which is preferably transparent but this is not essential in all embodiments. The polymer substrate 2 has a first surface 2a and a second surface 2b. It should be noted that wherever components are described herein as being "on" one of the surfaces of the polymer substrate 2, or actions are described as being performed "on" one of said surfaces, this does not require the component or action to be directly on the surface of the polymer substrate. Rather, some intermediate layer, such as a primer layer, could exist immediately on the surface of the polymer substrate itself and the component or action may be applied to or performed on that intermediate layer, unless otherwise specified.

Figure 1A:
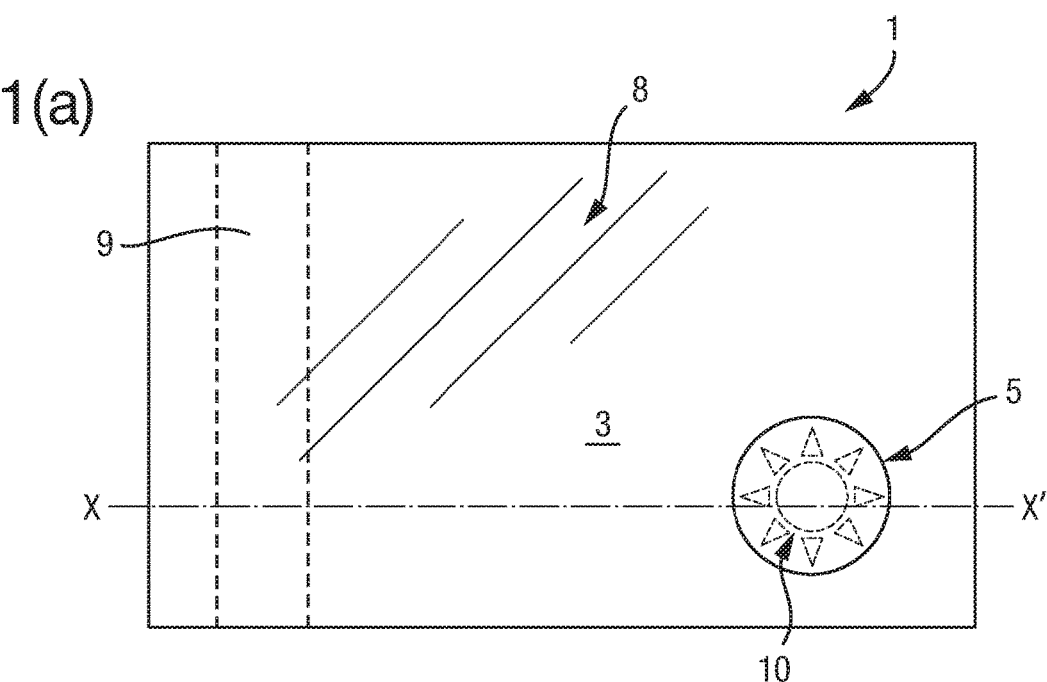
FIG. 1(a) shows an exemplary security document in plan view, FIGS. 1(b), (c) and (d) showing three alternative cross-sections along the line X-X'.

On at least one of the surfaces of the polymer substrate 2, preferably both, one or more opacifying layers 3a, 3b (indicated generally as 3 in FIG. 1(a)) are provided. The opacifying layers typically cover a large proportion of the surface area of the security document 1, in some cases the entire area (as in FIG. 1(c), described below), but in other cases being omitted on one or both sides of the polymer substrate 2 in localised areas to form window regions. An exemplary window region 5 is shown in FIGS. 1(a), (b) and (c) but is omitted in the FIG. 1(d) variant. The opacifying layer(s) 3 are configured to provide a suitable background for a graphics layer 8, typically applied by printing, which in the case of a banknote generally comprises secure fine line patterns such as guilloches, a portrait, currency and denomination information and the like. Thus the opacifying layers 3 are non-transparent and, in the case of a transparent polymer substrate 2, act to increase the opacity of the document 1 as a whole.

Figure 1B:
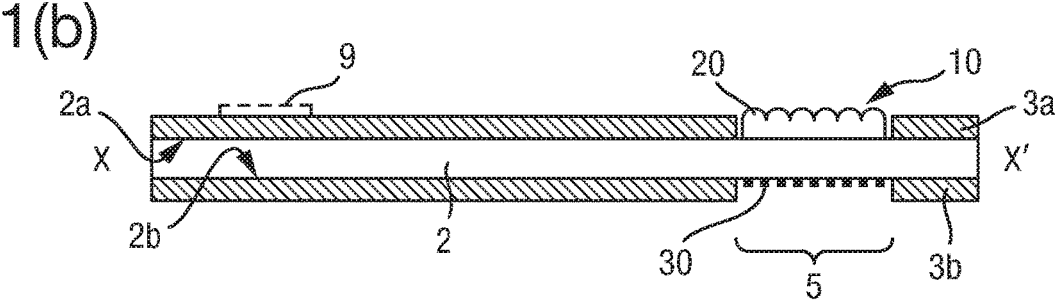
Figure 1C:
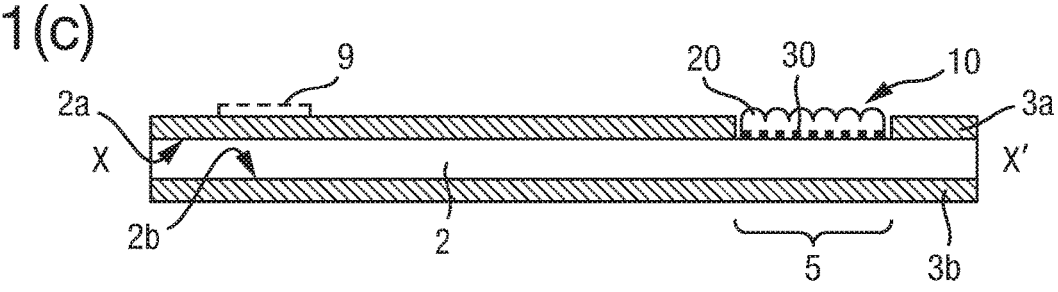

If the opacifying layers 3 are omitted in the window region 5 on both sides of the polymer substrate 2, as shown in FIG. 1(b), the window region will be a "full window" and, provided the polymer substrate is transparent, will itself be transparent. If the opacifying layers are omitted in the window region 5 on one side of the polymer substrate 2 but not the other, the window region will be a "half window" which is non-transparent but typically of lower opacity than the surrounding regions of the document 1. An example of a half window is shown in FIG. 1(c) in which the first opacifying layer(s) 3a on the first surface 2a of the polymer substrate 2 are absent in the window region 5 but the second opacifying layer(s) 3b on the second surface 2b are continuous across the window region 5. It will be appreciated that the window region 5 could contain a mixture of full and half window areas by arranging the gaps in the first and second opacifying layers to overlap one another only partially (not shown). In FIG. 1(c) there is no window, both opacifying layers 3a and 3b being continuous across region 5.

Figure 1D:
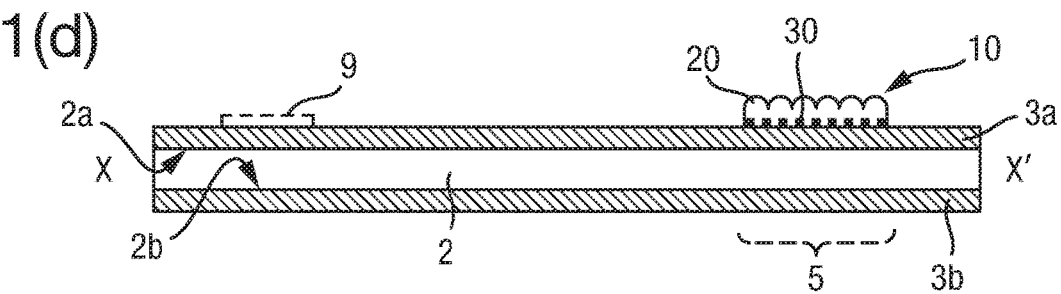

The security document 1 is provided with a security device 10 which comprises at least an array of focussing elements 20 provided on the first surface of the polymer substrate 2. The security device 10 could consist exclusively of the focussing element array 20 or may also comprise an image array 30 as discussed below. In the constructions of FIGS. 1(b) and 1(c), the focussing element array is applied in a gap defined by the first opacifying layer 3a such that the security device 10 is located in a window region 5 as discussed above. However this is not essential and FIG. 1(d) shows an example where the focussing element array 20 is applied to the first surface 2a of the polymer substrate 2 over the first opacifying layer(s) 3a. Preferred methods for manufacturing the focussing element array 20 are discussed below, as well as preferred configurations of the focussing element array 20 itself.

The image array 30, if provided, is preferably located in a plane which substantially corresponds to the focal plane of the focussing elements array 20 (e.g. to within +1-10%, more preferably +1-5%) so that the focussing element array 20 exhibits a substantially focussed image of the image array 30, which is illustrated schematically by the broken-line sun-shaped outline in FIG. 1(a). In practice this focussed image may be optically variable, i.e. have different appearances at different viewing angles, and as such may be referred to more generally as the "optical effect" exhibited by the security device 10. For instance, the image array 30 could co-operate with the focussing element array 20 to form a moiré magnification device, an integral imaging device or a lenticular device, the principles of each having been discussed above, or any combination thereof. Preferred methods of manufacturing the image array 30, as well as examples of its configuration, are discussed below.

The focussing element array 20 and image array 30 can be provided at various different positions provided the necessary spacing between them is achieved. In the FIG. 1(b) example, this spacing is provided at least in part by the polymer substrate 2 itself, which here is transparent. The focussing element array 20 is located on the first surface 2a of the polymer substrate 2 whilst the image array 30 is located on the second surface 2b. It will be appreciated that whilst FIG. 1(b) shows the device 10 as being located in a full window, the second opacifying layer(s) 3b could continue across all or part of the window region 5 (over the image array 30), forming a half window or a mixture of full and half window portions.

In the FIG. 1(c) example, both the focussing element array 20 and the image array 30 are provided on the first surface 2a of the polymer substrate 2, which now need not be transparent (although this is still preferred). The optical spacing is provided by means other than the polymer substrate 2. In this case the focussing element array 20 and image array 30 are located in a gap in the first opacifying layer(s) 3a which forms a half-window. However, the second opacifying layer(s) 3b could also be at least partially omitted across the window region 5 to form a full window or a mixture of full and half window portions.

In the FIG. 1(d) example, the focussing element array 20 and image array 30 are again both provided on the first surface 2a of the polymer substrate 2, this time over the first opacifying layer 3a since as previously indicated no window is formed in this case. Again the optical spacing is achieved by means other than use of the polymer substrate 2. It will be appreciated from the FIG. 1(d) example, in which the polymer substrate need not be transparent, that whilst security devices 10 of the sort disclosed herein are particularly well suited to application to documents based on polymer substrates, they are not limited in this regard and can be utilised on any type of security document, e.g. those based on paper substrates, or indeed on any article which requires protection from counterfeiting.

Depending on the type of optical effect desired to be displayed by the security device 10, accurate registration between the focussing element array 20 and the image array 30 may or may not be necessary. However this is highly desirable in certain cases.

The security documents and security devices disclosed herein can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all embodiments of the invention.

Typically to form the finished security document 1, a number of additional processes will take place, including printing of the graphics layer 8 already mentioned above, as well as application of any further security articles such as security threads, strips, patches, foils or the like which may carry features such as diffractive elements (e.g. holograms or Kinegrams), iridescent material, colour-shifting material etc. One example of such an applied security article is shown in FIG. 1 as strip 9. The so-formed material (generally in the form of a web or a sheet, at this stage, as discussed further below) will then be cut into individual security documents 1. All of these process steps are considered optional in the present disclosure and can be implemented by conventional means.

Figure 2:
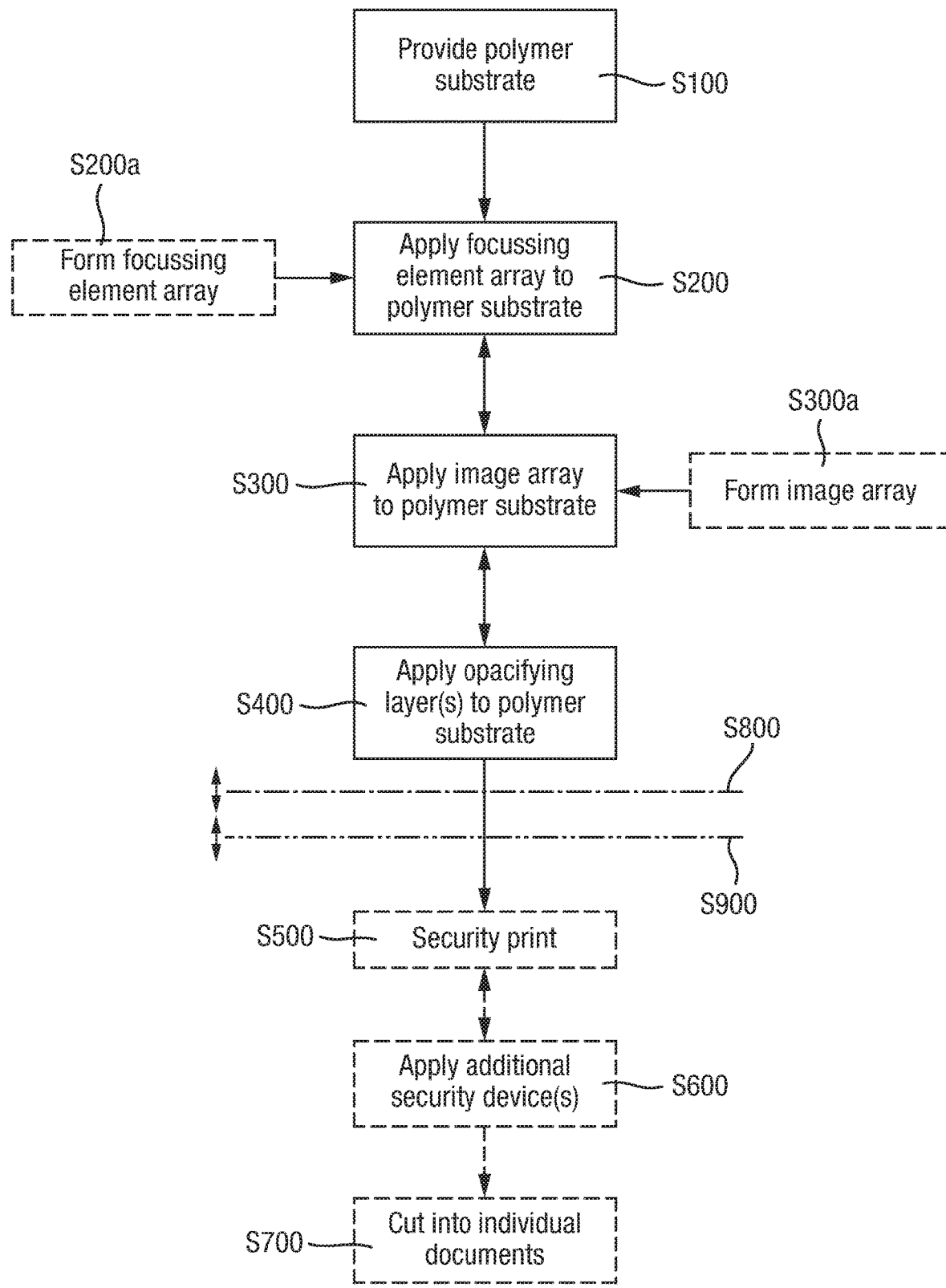
FIG. 2 is a flow diagram illustrating selected steps of a method of manufacturing a security document according to one embodiment.

Turning now to the manufacturing process, FIG. 2 is a flow diagram illustrating, at a high level, the main process steps in an exemplary implementation. It must be emphasised that the order of the steps can be varied significantly. Therefore, FIG. 2 serves merely to introduce the key steps involved in manufacturing a polymer-based security document and should not be considered to limit the order of those steps, except where otherwise indicated. It should further be noted that all steps shown in dashed lines are optional.

Thus in step S101, a polymer substrate 2 is provided, typically in web form.

In step S200, a focussing element array 20 is applied to the polymer substrate on its first surface. This will be described below but for the time being it is sufficient to note that the step S200 could involve actual formation of the focussing element array, either on the polymer substrate or on an intermediate component such as a security thread, strip or patch (indicated as step S200a) which is then affixed to the polymer substrate. However this is not essential since the focussing element array could be formed in some separate process, possibly by a different entity, as an article such as a security thread, strip or patch, in which case the present step S200 need only involve affixing the pre-formed focussing element array 20 to the polymer substrate 2. For this reason, in the main part the discussion below describes preferred methods of forming the focussing element array as taking place on a focussing element support layer, which could be the polymer substrate 2 but alternatively could be a carrier layer in such a component.

In step S300, an image array 30 is applied to the polymer substrate as will be described below. However, as in the case of the focussing element array 20, similarly step S300 may or may not involve the actual formation of the image array 30. That is, step S300 may comprise forming the image array 30 either on a surface of the polymer substrate or on an intermediate component such as a security thread, strip or patch (indicated as step S300a) which is then affixed to the polymer substrate. Alternatively the image array could be formed in some separate process, possibly by a different entity, as an article such as a security thread, strip or patch, in which case the present step S300 need only involve affixing the pre-formed image array 30 to the polymer substrate 2. For this reason, in the main part we describe preferred methods of forming the image array as taking place on a pattern support layer, which could be the polymer substrate 2 but alternatively could be a carrier layer in such a component.

Indeed, where the focussing element array 20 and the image array 30 are both formed away from the polymer substrate 2 and then applied thereto, the focussing element array 20 and the image array 30 could each be formed as part of one and the same security article (such as a thread, strip or patch) which can then be affixed to the polymer substrate 2 in a single step. Thus the focussing element support layer and the pattern support layer could be provided by a single support layer. It is noted as an aside that security articles equipped with a focussing element array 20 and an image array 30 can be applied to any type of security document, not necessarily one based on a polymer substrate.

In step S400, the at least one opacifying layer(s) are applied to the first and/or second surfaces of the polymer substrate 2. In practice this may optionally take place in several steps, which need not all be performed immediately sequentially, one after the other. For instance, one or more of the opacifying layers could be applied before steps S200 and/or S300.

In step S500, which is optional, the graphics layer 8 is applied to the opacifying layers, typically by way of security printing techniques. For example, the graphics layer 8 may be printed by any conventional printing technique, or combination of techniques, such as intaglio printing, lithographic printing, offset printing, flexographic printing, gravure printing and the like. The graphics layer 8 typically comprises high resolution patterns such as fine line patterns and guilloches, portraits, and other indicia. In step S600, which is also optional, any additional security devices on articles such as threads, strips, patches etc., are applied to the substrate. Any conventional techniques for applying such components can be utilised, including bonding by adhesives, lamination, hot stamping, transfer methods and the like. The security devices could be of any known type, such as holograms, kinegrams and other diffractive elements, iridescent or colour-shift material, etc. Steps S500 and S600 could take place in either order and/or as a series of sub-steps which could be intermingled with one another. Finally, the processed material is cut into individual security documents in step S700.

In the present example, all of the steps described have been web-based processes, i.e. applied to a web of the polymer substrate 2, e.g. in one in-line process. Typically a web with a large width (e.g. between 0.75 and 1.5 m) is supplied for this purpose. However, for some process steps it is desirable to reduce the width of the web, e.g. so that shorter (and hence less costly) processing tools can be used. It is also desirable to carry out certain process steps on individual sheets of the material, rather than on a continuous web. This is particularly the case for security print step S500. Hence, line S800 represents slitting the initial web along its longitudinal direction so as to reduce its width, subsequent processing steps utilising processing tools of correspondingly shorter width compared with those of the preceding steps. Line S900 represents dividing the web into sheets, by cutting it along its cross direction at intervals spaced in the longitudinal direction. This process is sometimes referred to as "sheeting". Each sheet will preferably be sized so as carry a plurality of the final security documents. Subsequent processes are performed using sheet-fed machinery.

It will be appreciated that the points in the process at which steps S800 and S900 are performed can be varied and are indicated only schematically in FIG. 2. Typically at least one process step will be performed on the reduced-width web (i.e. between steps S800 and S900), although this is not depicted here. Preferences will be discussed in section 7.

To illustrate the production of various key components of the security document 1 by the above steps, FIG. 3 schematically illustrates exemplary apparatus for carrying out steps S200, S300 and S400 on a polymer substrate 2 in the form of a web. It will be noted that the order of steps shown here is different from that in FIG. 2. The polymer substrate 2 is provided from a supply such as a reel 100. The polymer substrate may undergo various treatment steps (not shown in FIG. 3), such as the application of a primer or corona treatment, before being subjected to the processing described below. The polymer substrate is conveyed along a transport path by a transport module (not shown) of conventional construction. The direction of transit is termed the machine direction (MD) and the orthogonal direction in the plane of the web is the cross direction (CD).

At a focussing element station 200, a focussing element array 20 is applied to the first surface of the substrate. As mentioned above, this may involve actual forming of the focussing element array 20 in-situ on the polymer substrate, e.g. by cast-curing, or could involve supplying a security article 290, shown in the form of a thread or strip, from an ancillary supply 200a and affixing at least portions of it carrying a pre-formed focussing element array to the surface of the polymer substrate, e.g. by lamination, adhesive or hot-stamping. Further details of preferred methods for forming the focussing element array 20 are below. In the example shown, the focussing element array 20 is applied at spaced intervals so as to form one or more devices 10 on each section of the web that will form a separate security document once cut. However in other cases the focussing element array could be applied continuously along the polymer substrate 2.

At an opacifying layer station 400, one or more opacifying layer(s) are applied to the first and/or second surfaces of the polymer substrate 2, as described further below. Since the focussing element array 20 has already been applied to the polymer substrate in this embodiment, the application of the first opacifying layer 3a should omit at least part of the area(s) in which the focussing element array 20 is disposed so that it remains at least partially uncovered. The exception is where the focussing element array comprises mirrors rather than lenses in which case it could be covered on the first surface of the substrate and ultimately viewed from the opposite side. In the example shown, the second opacifying layer 3b is also omitted in the same area, so as to form a full window in which the focussing element array 20 is arranged.

At an image array station 300, an image array 30 is applied to the second surface of the polymer substrate 2. As mentioned above, this may involve actual forming of the image array 30 in-situ on the polymer substrate, e.g. by printing, or could involve supplying a security article 390, shown in the form of a thread or strip, from an ancillary supply 300a and affixing at least portions of it carrying a pre-formed image array to the surface of the polymer substrate, e.g. by lamination, adhesive or hot-stamping. Further details of preferred methods for forming the image array 30 are below. In the example shown, the image array 30 is applied opposite each of the focussing element arrays 20 such that in each window the device 10 exhibits a focussed image of the image array 30.

The web can then go on to be subjected to any of the optional processing steps described previously with respect to FIG. 2, not shown in FIG. 3. As noted above, whilst the apparatus shown in FIG. 3 is depicted as an in-line, web-based process, it is not essential that all of steps S200, S300 and S400 be carried out in such a way.

A focussing element array 20 comprises a plurality of focussing elements, typically lenses or mirrors, arranged over an area typically in a regular one-dimensional or two-dimensional grid. The nature of the focussing elements will depend on the desired optical effect but examples include cylindrical focussing elements, spherical focussing elements, aspherical focussing elements, elliptical focussing elements, Fresnel focussing elements and the like. The focussing elements can operate on refraction, diffraction or reflection (in the case of mirrors). For brevity, in the discussion below the term "lens" is used interchangeably with the term "focussing element" but this should not be taken as limiting.

The focal length of the lenses is directly related to their size (radius) and the available optical spacing must be taken into account when designing the lens array. Generally, the relationship between focal length f and lens radius r is:

$$f \propto \frac{r}{\Delta n}$$

where $\Delta n$ is the difference in refractive index across the interface defining the lens surface. In an example, for an image array 30 on the second surface of the polymer substrate 2 to be focussed by a focussing element array on the first surface of the polymer substrate 2, the optical geometry must be taken into account when selecting the thickness of the polymer substrate 2 (and any other optical spacer layer that may exist between the focussing element array 20 and the image array 30) and the dimensions of the lenses. In preferred examples the thickness is in the range 50 to 100 microns, hence the focussing element array should have a focal length in the same range. The periodicity and therefore maximum base diameter (or width, in the case of elongate lenses) of the focusing elements is preferably in the range 5 to 200 μm, more preferably 10 to 100 μm and even more preferably 10 to 70 μm. In other examples, the focussing element array 20 and image array 30 may both be arranged on the same side of the polymer substrate in which case the available optical spacing is likely to be smaller (e.g. 5 to 50 microns) and hence the dimensions of the lenses will need to be correspondingly reduced. The f number for the lenticular focusing elements is preferably in the range 0.1 to 16 and more preferably 0.5 to 4.

The focussing element array 20 could include focussing elements with different optical properties from one another, e.g. different focal length, in different sub-regions of the array, by appropriate design of the elements' shape and size. For example, the focussing element array could include lenses of different height from one another giving rise to different focal lengths in each region. In such cases, if a focussed image of an image array 30 is desired the image array 30 may be located at just one of the focal lengths, or two image arrays 30 could be provided, one at each focal length.

The focussing element array 20 can be formed either on the first surface of the polymer substrate 2 or could be on another (transparent) support layer which is then affixed to the first surface of the polymer substrate 2. As defined above, the term "focussing element support layer" is intended to cover both of these options and is therefore used below. In places this is shorted to "support layer" for brevity.

In embodiments of the present invention, the focussing element array 20 is formed by cast-curing. This involves applying a transparent curable material either to the support layer or to a casting tool carrying a surface relief defining the desired focussing element array, forming the material using the casting tool and curing the material to fix the relief structure into the surface of the material.

For reference, FIGS. 4 and 5 schematically depict two cast-curing techniques which can be used in embodiments of the invention. Components common to both methods are labelled with the same reference numbers. In both cases the process is shown as applied to a focussing element support layer 201, comprising a transparent film, which may be the aforementioned polymer substrate 2 or could be another layer which is later applied to the polymer substrate 2. In each case, Figure (a) depicts the apparatus from a side view, and Figure (b) shows the support layer in a perspective view, the manufacturing apparatus itself being removed for clarity. FIG. 5(c) shows a variant of the FIG. 5(a) example.

Figure 6A:
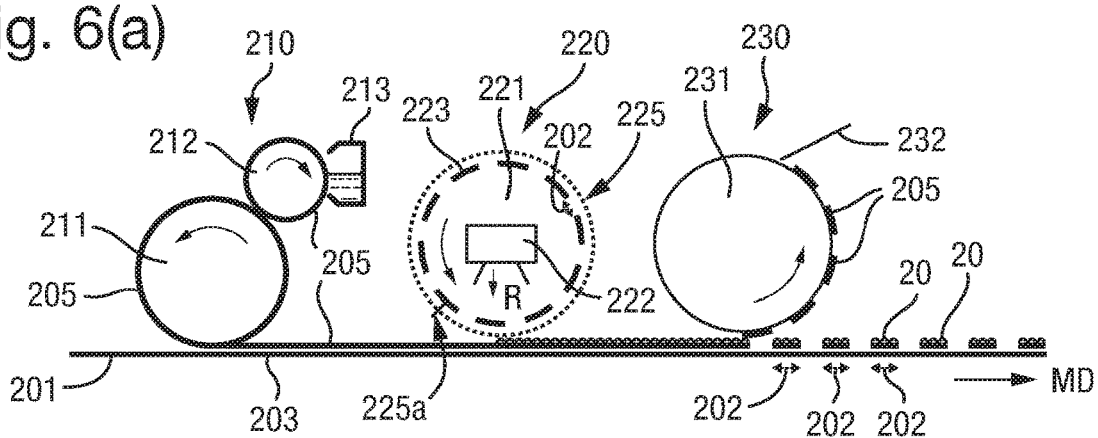
Figure 6B:
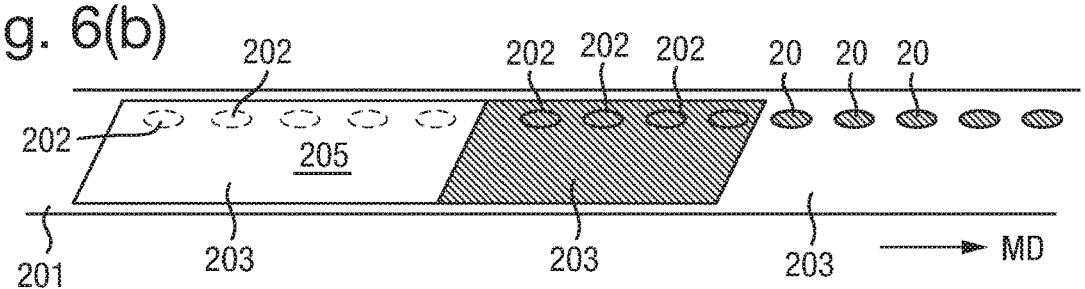
Figure 7A:
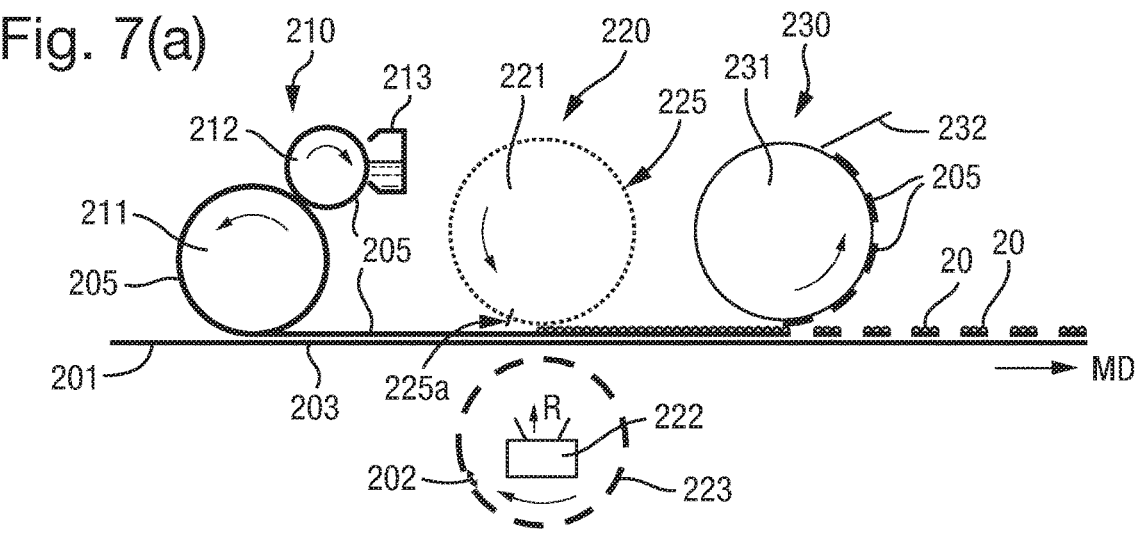
Figure 7B:
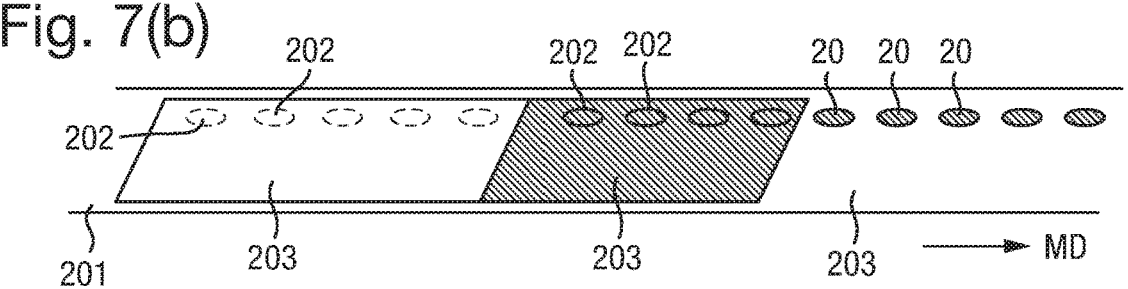

In the FIG. 4 example, a transparent curable material 205 is first applied to the support layer 201 using an application module 210 which here comprises a patterned print cylinder 211 which is supplied with the curable material from a doctor chamber 213 via an intermediate roller 212. For example, the components shown could form part of a gravure printing system. Other printing techniques such as lithographic, flexographic, screen printing or offset printing could also be used. Print processes such as these are preferred since the curable material 205 can then be laid down on the support 201 only in first regions 202 thereof, the size, shape and location of which can be selected by control of the print process, e.g. through appropriate configuration of the pattern on cylinder 211. However, in other cases, an all over coating method could be used, e.g. if the focussing element array is to be formed all over the support 201 or if the method variants described below with respect to FIGS. 6 and 7 are utilised. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the focussing elements which are to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 could be configured such that the relief structure 225 is only provided at regions corresponding to shape and position of the first regions 202 of curable material 205. However this gives rise to the need for accurate registration between the application module 210 and the casting module 220 in order that the focussing elements are accurately placed in each first region 202 of the curable material. Therefore in a particularly preferred example, the cylinder 221 carries the relief structure corresponding to the focussing elements over an area larger than that of the first region 202, preferably around its complete circumference and most preferably over substantially its whole surface (although axial regions which will not come into the vicinity of the curable material may be excluded). In this way, each entire first region 202 of curable material 205 is guaranteed to come into contact with the surface relief structure 225 such that the focussing element array is formed over the full extent of the material. As a result, the shape, size and location of the focussing element array 20 is determined solely by the application of the curable material by the application module.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 although the source 222 could alternatively be positioned above the support layer 201, e.g. inside cylinder 221 if the cylinder is formed from a suitable transparent material such as quartz.

FIG. 5 shows variants of the above process in which, rather than apply the curable material 205 to the support layer 201, it is applied instead to the surface of the casting cylinder 225. Again this is preferably done in a patterned manner, using a print cylinder 211 to transfer the curable material 205 only onto the first regions 202 on the casting cylinder 221. Upon contact with the support layer 201, the regions 202 of curable material 205 affix to the support layer 205 and curing preferably takes place at this stage to ensure strong bonding. The so-formed focussing element arrays 20 again have a shape, size and location determined solely by the application module 210.

FIG. 5(c) illustrates an alternative implementation in which rather than apply the curable material 205 to the support layer 201 or the casting cylinder 221 in a patterned manner to define the first regions 202, the casting cylinder 221' is modified to achieve such patterning. Thus, the surface relief 225 defining the focussing element array is only provided in discrete patches of the surface of the casting cylinder 221' with the intervening areas having no surface relief. The curable material 205 can be applied all over the surface of casting cylinder 221', e.g. from a reservoir as shown or from an applicator roller. The curable material 205 fills at least the relief regions 225 and if any is collected on the intervening surface regions, a removal device such as a doctor blade or squeegee 213' may be provided to clear those areas. The support layer 201 is brought into contact with the cylinder 221', preferably in a wrap configuration as shown, and the curable material 205 is exposed to appropriate curing energy R from a source 222, preferably during contact as shown. The support layer 201 is then separated from the cylinder 221' and now carries discrete patches of focussing element arrays 20 in respective first regions 202.

In all of the above examples, preferably the first regions 202 have the form of indicia, such as an alphanumeric character, a symbol, logo or other item of information to increase the complexity of the design.

The surface relief 225 may be carried by cylinder 221 in the form of a sheet embossed or otherwise provided with the required relief, which is wrapped around the cylinder 221 and clamped in place. This may result in a noticeable join 225a where the two ends of the sheet meet, at which there is a discrepancy in the relief pattern. If replicated into one of the focussing element arrays this would cause a reduction in quality. It is therefore preferred that the casting module is at least coarsely registered to the application module so that the location of join 225a where it contacts support 201 does not coincide with any of the first regions 202 but rather is located between them, as shown by the example location labelled 225b. In cases where the curable material is applied (and retained) all over the support, or at least along a continuous strip in the machine direction MD, this join 225a is still preferably positioned outside the first region which is to be used to form the security device, advantageously in a location which will subsequently be coated with one of the opacifying layers 3. To achieve this consistently it is desirable for the process for forming the focussing element array to be registered with the opacifying layer application process, e.g. performed in the same in-line process.

FIGS. 6 and 7 show an alternative cast-cure process for forming the focussing element array according to another example. Again, components corresponding to those described above are labelled with the same reference numerals used previously and will not be described in detail again. In this case, the shape, size and location of each focussing element array is determined not by the initial application of the curable material 205 to the support layer 201 but by selective curing of that material.

Referring first to FIG. 6, here the application module 210 applies the curable material over not only the first regions 202 in which the focussing element array is ultimately to be located, but additionally over a second region 203 such that in this example substantially the whole of the first surface of the support layer 201 is coated with the curable material 205. Thus whilst in the example shown the application module is still constituted by a printing system as described previously (but in which the cylinder 211 defines a print area substantially over the whole area of the support as described here), this could be replace by a non-selective, all over coating module. The curable material 205 is then brought into contact with the casting tool 220 which again in this case is preferably provided with the appropriate surface relief 225 over substantially the whole of its circumference. Thus, the whole of the first and second regions 202, 203 of the curable material are formed in accordance with the relief structure. However, only selected portions of the material are cured. This can be achieved by providing a mask 223 through which the curable material 205 is exposed to the curing energy, e.g. UV radiation. The mask 223 defines radiation-transparent portions corresponding to the first regions 202 and radiation-opaque portions in between such that the second region 203 of the curable material is not cured. In this example, the radiation source 222 is located inside the casting cylinder 221 and the mask 223 is also arranged on the inside of that cylinder.

A removal module 230 is additionally provided to remove the uncured material 205 from the second region 203, leaving only the cured material in the first regions 202, bearing the desired surface relief and thereby forming the focussing element arrays 20. The removal module 230 can comprise a cleaning roller 231 with a (preferably soft) surface to which the uncured material 205 will adhere and be lifted off the support 201. A cleaning system such as a doctor blade or squeegee 232 may be provided to remove the waste material 205 from the roller 231.

In a variant of the FIG. 6 example, the patterned mask 223 and curing energy source 222 may be arranged on the other side of the transport path, as shown in FIG. 7. Here the support layer 201 is conveyed through a nip defined between the casting cylinder 221 and a mask cylinder 223 arranged to move at substantially the same speed as one another. In other respects the FIG. 7 apparatus is the same as that of FIG. 6.

In both variants, any join 225a in the surface relief on the casting cylinder is preferably aligned with one of the opaque portions of the mask 223 such that the area of material 205 into which that part of the surface relief is formed will not be cured and is removed by station 230.

In both variants, the curable material 205 could be applied to the surface of the casting cylinder 221 instead of onto the support later 201, e.g. using an arrangement corresponding to that shown in FIG. 5.

Any of the above-described methods can be used to implement embodiments of the invention, by appropriate design of the surface relief 225, examples of which will now be described.

FIG. 8 shows (a) an exemplary surface relief 225 as may be carried on the casting cylinder 221 in any of the methods described above, and (b) a corresponding exemplary security device made using the surface relief 225 shown in FIG. 8(a), both in accordance with a first embodiment of the invention. The surface relief 225 is formed with a number of structures 227 of greater depth than the maximum depth of the focussing elements 20a. In the focussing element array 20 this results in protruding features 27 which stand proud of the focussing element array surface, preferably by a height difference Δh of at least 5 microns, more preferably at least 10 microns. The protruding features 27 help to protect the surface of the lenses from damage by holding foreign objects away from the lenses during handling. Preferably the features 27 are spaced periodically across the array, most preferably with a spacing which depends on the size of the lenses. More than one lens 20a is located between each neighbouring pair of features 27 so as to minimise the visual impact of the features 27. Desirably, the features 27 collectively take up no more than 10%, preferably no more than 5% of the area of the array 20 in order to further reduce any visual effect thereof.

Nonetheless it is also desirable to provide the features 27 at reasonably frequent intervals so that the gaps between them are not so large that foreign bodies can easily pass between them and in doing so contact the lenses 20. Hence, in preferred examples, the features 27 may be inserted at intervals of at least every 50 lenses, more preferably at least every 30 lenses, most preferably at least every 10 lenses (meaning that there will be at least one such feature 27 for every 50, preferably every 30, more preferably every 10 lenses, i.e. no more than 50 lenses 20a between neighbouring features 27).

In preferred examples the features 27 may have a width w of lesson more than 10 times the lens diameter d, preferably no greater than 5 times, most preferably no greater than 3 times. In particularly preferred examples the features 27 may have a width w substantially equal to the diameter d of the lenses. Again this is because it is desirable that the features 27 should not impact significantly on the appearance of the device.

In this example the features 27 are shown to have the form of posts (i.e. each feature being located at a point localised in two dimensions) or fences (i.e. each feature extending along a line and hence localised in only one dimension), which may not have any optically active surface. However, in other examples the features 27 could themselves take the form of focussing elements such as lenses. In this case the lenses 20a forming the array 20 are considered the primary focussing elements since only these significantly contribute to the appearance of the device. The features 27 would comprise secondary focussing elements which do not make a significant contribution due to their arrangement across the array as described above.

In all embodiments, the curable material 205 which forms the focussing element array 20 including the features 27 is preferably radiation-curable and may comprise a resin which may typically be of one of two types, namely:
a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

The curable material 205 could itself also be elastomeric and therefore of increased flexibility. An example of a suitable elastomeric curable material is aliphatic urethane acrylate (with suitable cross-linking additive such as polyaziridine).

As noted above, the provision of an image array 30 is optional but preferred. It is particularly advantageous to provide an image array configured to co-operate with the focussing element array 20 to produce an optically variable effect. For example, the image array 30 and focussing element array 20 may, in combination, form a moiré magnification device, an integral imaging device or a lenticular device, the mechanism on which each operates having been discussed above.

Security devices of the above types depend for their optical effect at least in part upon the high resolution with which the image array 30 has been produced. For instance, in a lenticular device, each image element or "slice" making up image array 30 must be narrower than the pitch of the focussing element array 20, which as discussed above is typically no more than 100 microns, usually less. For example, if the diameter of the focusing elements is 30 μm then each image element may be around 15 μm wide or less. Alternatively for a smooth lenticular animation effect it is preferable to have as many different interleaved images as possible, typically at least five but ideally as many as thirty. In this case the size of the image elements should be in the range 0.1 to 6 μm. In practice, in a lenticular device, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal approximates to $2r$. Now for a close packed lens array, the base diameter of the lens is only slightly smaller than the lens pitch, and since the maximum value the base diameter can have is $2r$, it then follows that the maximum value for the lens pitch is close to the value $2r$ which closely approximates to the lens focal length and therefore the device thickness.

To give an example, for a security thread component as may be incorporated into a banknote, the thickness of the lenticular structure and therefore the lens focal length is desirably less than 35 μm. Let us suppose we target a thickness and hence a focal length of 30 μm. The maximum base diameter we can have is from the previous discussion equal to 2r which closely approximates to the lens focal length of 30 µm. In this scenario the f-number, which equals (focal length/lens base diameter), is very close to 1. The lens pitch can be chosen to have a value only a few µm greater than the lens diameter—let us choose a value of 32 µm for the lens pitch. It therefore follows for a two channel one-dimensional lenticular device (i.e. two image element strips per lens) we need to fit two image strips into 32 µm and therefore each strip is 16 µm wide. Similarly for a four channel one-dimensional lenticular the printed line width requirement drops down to 8 µm (in this example).

As a result, the f-number of the lens should preferably be minimised, in order to maximise the lens base diameter for a given structure thickness. For example suppose we choose a higher f-number of 3, consequently the lens base diameter will be 30/3 or 10 µm. Such a lens will be at the boundary of diffractive and refractive physics—however, even if we still consider it to be primarily a diffractive device then the we may assume a lens pitch of say 12 µm. Consider once again the case of a two channel device, now we will need to print an image strip of only 6 µm and for a four channel device a strip width of only 3 µm.

Similar considerations apply to other types of devices. For example, in moiré magnifiers and integral imaging devices, each microimage must be of the same order of magnitude as one lens, or smaller. Thus, the microimage will typically have overall dimensions of 50 microns or less. In order to provide the microimage with any detail, small line widths are required, e.g. of 15 microns or preferably less, ideally 5 microns or less.

Conventional printing techniques will generally not be adequate to achieve such high resolution. For instance, typical printing processes used to manufacture pattern elements (image arrays) for security devices include intaglio, gravure, wet lithographic printing and dry lithographic printing. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 µm and 50 µm. For example, with gravure or wet lithographic printing it is possible to achieve line widths down to about 15 µm. However, consistent results at this resolution are difficult to achieve and in any case this level of resolution still imposes a significant limitation on the security device. Thus while any of the above-mentioned techniques can be employed in embodiments of the present invention, higher resolution methods (i.e. suitable for achieving smaller line widths) for forming the image array 30 would be highly desirable.

One method which has been put forward as an alternative to the printing techniques mentioned above, and can be employed in embodiments of the invention, is used in the so-called Unison Motion™ product by Nanoventions Holdings LLC, as mentioned for example in WO-A-2005052650. This involves creating pattern elements ("icon elements") as recesses in a substrate surface before spreading ink over the surface and then scraping off excess ink with a doctor blade. The resulting inked recesses can be produced with line widths of the order of 2 µm to 3 µm.

A different method of producing high-resolution image elements is disclosed in WO-A-2015/044671 and is based on flexographic printing techniques. A curable material is placed on raised portions of a die form only, and brought into contact with a support layer preferably over an extended distance. The material is cured either whilst the die form and support layer remain in contact and/or after separation. This process has been found to be capable of achieving high resolution and is therefore advantageous for use in forming the image array 30 in the present application.

Some more particularly preferred methods for generating patterns or micropatterns (i.e. an image array 30) on a substrate are known from US 2009/0297805 A1 and WO 2011/102800 A1. These disclose methods of forming micropatterns in which a die form or matrix is provided whose surface comprises a plurality of recesses. The recesses are filled with a curable material, a treated substrate layer is made to cover the recesses of the matrix, the material is cured to fix it to the treated surface of the substrate layer, and the material is removed from the recesses by separating the substrate layer from the matrix.

Another strongly preferred method of forming a micropattern is disclosed in WO 2014/070079 A1. Here it is taught that a matrix is provided whose surface comprises a plurality of recesses, the recesses are filled with a curable material, and a curable pickup layer is made to cover the recesses of the matrix. The curable pickup layer and the curable material are cured, fixing them together, and the pickup later is separated from the matrix, removing the material from the recesses. The pickup layer is, at some point during or after this process, transferred onto a substrate layer so that the pattern is provided on the substrate layer.

The above-mentioned methods described in US 2009/0297805 A1, WO 2011/102800 and WO 2014/070079 A1 have been found to produce particularly good results and are therefore particularly preferred for use in forming the image array 30 in embodiments of the invention.

Figure 9:
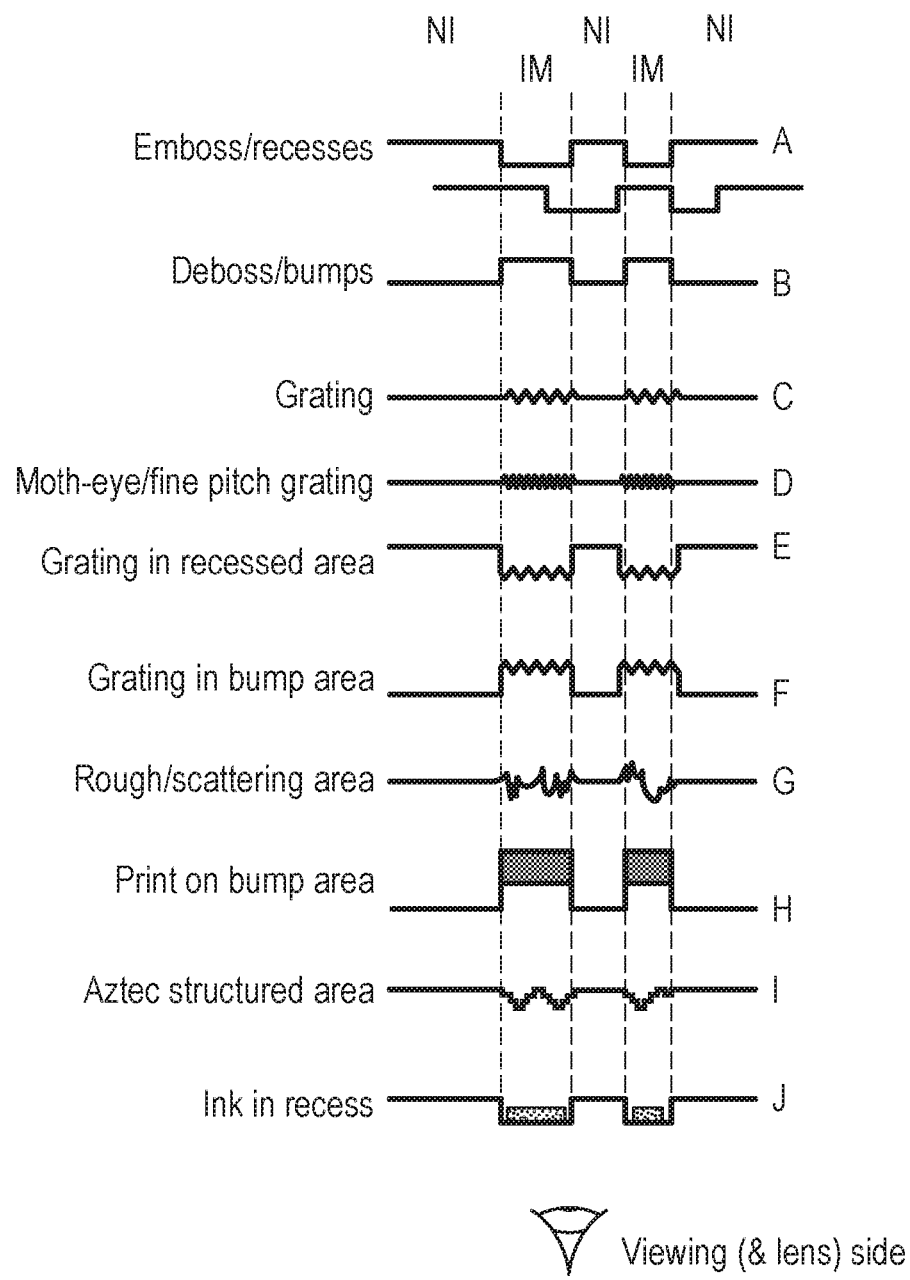

In other examples the image array 30 can be formed by a relief structure and a variety of different relief structure suitable for this are shown in FIG. 9. Thus, FIG. 9a illustrates image regions of the image elements (IM), in the form of embossed or recessed regions while the non-embossed portions correspond to the non-imaged regions of the elements (NI). FIG. 9b illustrates image regions of the elements in the form of debossed lines or bumps.

In another approach, the relief structures can be in the form of diffraction gratings (FIG. 9c) or moth eye/fine pitch gratings (FIG. 9d). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements had been created by writing different diffraction tracks for each element, then as the device is tilted, lenticular transition from one image to another will occur as described above, during which the colour of the images will progressively change due to the different diffraction gratings. A preferred method for writing such a grating would be to use electron beam writing techniques or dot matrix techniques. Using a diffractive structure to provide the image elements provides a major resolution advantage: although ink-based printing is generally preferred for reflective contrast and light source invariance, techniques such as modern e-beam lithography can be used generate to originate diffractive image strips down to widths of 1 µm or less and such ultra-high resolution structures can be efficiently replicated using UV cast cure techniques.

Such diffraction gratings for moth eye/fine pitch gratings can also be located on recesses or bumps such as those of FIGS. 9a and b, as shown in FIGS. 9e and f respectively.

FIG. 9g illustrates the use of a simple scattering structure providing an achromatic effect.

Further, in some cases the recesses of FIG. 9a could be provided with an ink or the debossed regions or bumps in FIG. 9b could be provided with an ink. The latter is shown in FIG. 9h where ink layers 200 are provided on bumps 210. Thus the image areas of each image element could be created by forming appropriate raised regions or bumps in a resin layer provided on a transparent substrate. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner when the device is tilted to create the lenticular animation effect described above, the images will also be seen to change colour as the observer moves from one view to another. In another example all of the image elements in one region of the device could be provided in one colour and then all in a different colour in another region of the device.

Finally, FIG. 9i illustrates the use of an Aztec structure.

Additionally, image and non-image areas could be defined by combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 9 a, b, e, f, h and i, the height or depth of the bumps/recesses is preferably in the range 0.5 to 10 μm and more preferably in the range of 1 to 2 μm. The typical width of the bumps or recesses will be defined by the nature of the artwork but will typically be less than 100 μm, more preferably less than 50 μm and even more preferably less than 25 μm. The size of the image elements and therefore the size of the bumps or recesses will be dependent on factors including the type of optical effect required, the size of the focusing elements and the desired device thickness.

The invention claimed is:

1. A method of making a security device, comprising:
   (a) forming an array of primary focusing elements on a first region of a focussing element support layer, by:
   (a)(i) applying at least one transparent curable material either to the focusing element support layer or to a casting tool carrying a surface relief over an area which includes at least the first region, the surface relief comprising portions corresponding to the primary focusing elements;
   (a)(ii) forming the transparent curable material(s) with the casting tool;
   (a)(iii) curing the transparent curable material(s) so as to retain the surface relief in the first region; and
   (b) providing an image array located in a plane spaced from the array of primary focussing elements by a distance substantially equal to the focal length of the primary focusing elements, wherein the primary focusing elements exhibit a substantially focused image of the image array,
   wherein the surface relief further includes a plurality of structures of greater depth than the height of the primary focusing elements such that the cured transparent material(s) include a plurality of features protruding above the height of the primary focussing elements between primary focusing elements of the array, wherein the surface relief is configured such that more than one of the primary focusing elements of the array space each of the plurality of features from the next, and
   wherein the features protruding above the height of the primary focusing elements are arranged with a spacing of at least one feature every 50 primary focusing elements.

2. A method according to claim 1, wherein the features protruding above the height of the primary focusing elements are spaced periodically across the array.

3. A method according to claim 1, wherein collectively the plurality of features protruding above the height of the primary focusing elements occupies no more than 10% of the first region.

4. A method according to claim 1, wherein each of the features protruding above the height of the primary focusing elements is spaced from the next by at least 5 primary focusing elements.

5. A method according to claim 1, wherein each of the features protruding above the height of the primary focusing elements has a width of no greater than 10 times the primary focusing element diameter.

6. A method according to claim 1, wherein each of the features protruding above the height of the primary focusing elements has a height of at least 5 microns greater than the height of the primary focusing elements.

7. A method according to claim 1, wherein at least some of the plurality of features protruding above the height of the primary focussing elements comprise secondary focusing elements.

8. A method according to claim 1, wherein the primary focusing elements comprise lenses or mirrors.

9. A security device, comprising
   an array of primary focusing elements formed of at least one curable transparent material disposed across a first region of a focusing element support layer, wherein the array further includes a plurality of features protruding above the height of the focusing elements, formed of the at least one curable material, between primary focusing elements of the array, wherein more than one of the primary focusing elements of the array space each of the plurality of features from the next and wherein the features are arranged with a spacing of at least one feature every 50 primary focusing elements, and
   an image array located in a plane spaced from the array of focusing elements by a distance substantially equal to the focal length of the focusing elements, wherein the focusing elements exhibit a substantially focussed image of the image array.

10. A security device according to claim 9, wherein the features protruding above the height of the primary focusing elements are spaced periodically across the array.

11. A security device according to claim 9, wherein the features protruding above the height of the primary focusing elements are arranged with a spacing of at least one feature every 30 primary focusing elements.

12. A security device according to claim 9, wherein collectively the plurality of features protruding above the height of the primary focusing elements occupies no more than 10% of the first region.

13. A security device according to claim 9, wherein each of the features protruding above the height of the primary focusing elements is spaced from the next by at least 5 primary focusing elements.

14. A security device according to claim 9, wherein each of the features protruding above the height of the primary focusing elements has a width of no greater than 10 times the primary focusing element diameter.

15. A security device according to claim 9, wherein each of the features protruding above the height of the primary focusing elements has a height of at least 5 microns greater than the height of the primary focusing elements.

16. A security device according to claim 9, wherein at least some of the plurality of features protruding above the height of the primary focusing elements comprise secondary focusing elements.

17. A security device according to claim 9, wherein the primary focusing elements comprise lenses or mirrors, preferably spherical, aspherical or cylindrical lenses or mirrors.

18. A security device according to claim 9, wherein the surface of the focusing element array is uncovered.

\* \* \* \* \*